United States Patent
Kemp et al.

(10) Patent No.: US 10,504,136 B2
(45) Date of Patent: Dec. 10, 2019

(54) MEASURING PERFORMANCE OF CONTENT AMONG GROUPS OF SIMILAR USERS OF AN ONLINE SYSTEM

(71) Applicant: Facebook, Inc., Menlo Park, CA (US)

(72) Inventors: Patrick James Kemp, Menlo Park, CA (US); Frederick Ross Leach, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/997,465

(22) Filed: Jan. 15, 2016

(65) Prior Publication Data

US 2017/0206548 A1    Jul. 20, 2017

(51) Int. Cl.
*G06Q 30/02* (2012.01)

(52) U.S. Cl.
CPC .................. *G06Q 30/0242* (2013.01)

(58) Field of Classification Search
USPC ...... 705/14.41, 14.49, 14.66, 14.55; 709/203
See application file for complete search history.

(56) References Cited

U.S. PATENT DOCUMENTS

| | | | | |
|---|---|---|---|---|
| 8,892,630 B1* | 11/2014 | Curtis | ................... | G06Q 50/01 709/203 |
| 2014/0067546 A1* | 3/2014 | Pike | ....................... | G06Q 50/01 705/14.66 |
| 2015/0142551 A1* | 5/2015 | Papakipos | .......... | G06Q 30/0261 705/14.41 |
| 2016/0055532 A1* | 2/2016 | Connolly | ........... | G06Q 30/0257 705/14.55 |
| 2016/0125455 A1* | 5/2016 | Tong | .................. | G06Q 30/0251 705/14.49 |
| 2016/0300262 A1* | 10/2016 | Gao | .................... | G06Q 30/0269 |

FOREIGN PATENT DOCUMENTS

WO    WO-2004089397 A2 *   10/2004   ........... G11B 27/105

OTHER PUBLICATIONS

Christopher Pappas, 8 Tips to measure your online training effectiveness, 2015 (Year: 2015).*

* cited by examiner

*Primary Examiner* — Tarek Elchanti
(74) *Attorney, Agent, or Firm* — Fenwick & West LLP (57) ABSTRACT

An online system generates metrics describing performance of a content item presented to its users by various entities based on a number of events associated with an exposed group of users presented with a content item and a control group of users not presented with the content item and similar to users of the exposed group. The online system receives information describing presentation of the content item to each user of the exposed group via client devices associated with users of the exposed group. The online system provides information used by the online system to identify each user in the exposed group and in the control group to a trusted third party, which identifies information describing events associated with the content item from one or more entities. Based on the identified information, a metric is generated to describe the effectiveness of the content item.

23 Claims, 4 Drawing Sheets

MEASURING PERFORMANCE OF CONTENT AMONG GROUPS OF SIMILAR USERS OF AN ONLINE SYSTEM

BACKGROUND

This disclosure relates generally to online systems, and more specifically to measuring performance of content presented to online system users.

Online systems allow users to connect to and to communicate with other users of an online system. Some online systems, such as social networking systems, also allow users to create user accounts or profiles on the online systems that are tied to the users' identities and include information about the users, such as the users' interests and demographic information. The users may be individuals or entities, such as corporations or charities. Online systems commonly present various content items provided by their users to other users. For example, online systems commonly present their users with organic content, which is content for which an online system does not receive compensation in exchange for presenting to its users. Types of organic content include declarative information provided by a user, status updates, check-ins to locations, images, photographs, videos, text data, or any other information a user wishes to share with additional users of the online system.

In addition to presenting users with organic content, online systems commonly allow entities (e.g., businesses) to sponsor presentation of content on online systems to gain public attention for an entity's products or services or to persuade online system users to take action regarding the entity's products or services. Many online systems receive compensation from an entity for presenting online system users with certain types of sponsored content provided by the entity. Frequently, online systems charge an entity for each presentation of sponsored content to an online system user or for each interaction with sponsored content by an online system user. For example, an online system receives compensation from an entity each time a content item provided by the entity is displayed to a user on the online system or each time a user is presented with a content item on the online system and the user interacts with the content item or performs another action after being presented with the content item (e.g., visits a physical location associated with the entity that provided the content item).

Entities that provide compensation to an online system in exchange for presenting sponsored content to online system users may expend significant resources promoting their products, services or brands on the online system. Hence, the entities are typically interested in measuring effectiveness of sponsored content item presentation at influencing users of the online system to perform certain actions after being presented with such content items. For example, an entity may be interested in measuring effectiveness of presenting a sponsored content item on an online system at inducing online system users to visit various physical locations associated with the entity, such as a retail stores. As another example, an entity may be interested in measuring effectiveness of presenting a sponsored content item on an online system at influencing an online system user to purchase the entity's products or services.

Conventional methods for measuring effectiveness of presenting a content item at inducing action often include polling users to determine whether users have been exposed to the content item on an online system or whether exposure to the content item on an online system caused the user to perform a particular action. For example, comparing a number of times a location associated with a content item is visited by individuals who have indicated they were exposed to the content item and a number of times the location is visited by individuals who have indicated they were not exposed to the content item, allows determination of the content item's effectiveness at influencing individuals to visit the location. However, entities often obtain unreliable answers to polls because polled users often have limited recall regarding how they became aware of an entity's products or how they were enticed to perform a particular action.

Further, conventional methods for measuring effectiveness of presenting a content item in inducing actions are often most useful when the effectiveness is measured among users having common characteristics. For example, an entity seeks to determine effectiveness of presenting sponsored content items at influencing users in particular age groups or having a particular gender in influencing the users to perform one or more actions. However, polls have limited effectiveness in identifying users having similar characteristics, as users may provide incorrect information about their characteristics or decline to provide information about their characteristics.

SUMMARY

An online system generates metrics describing performance of content presented to its users by various entities, such as third party systems, based on an identified number of events associated with a group of users who were presented with a content item by a particular entity (an "exposed" group of users) and an additional group of users (i.e., a "control" group of users) who were not presented with the content item and who have at least a threshold measure of similarity to the exposed group of users. The identified number of events includes a number of conversion events (or "conversions"), which are the occurrences of one or more events associated with a content item. For example, conversions include a location associated with a user being within a threshold distance of a location associated with a content item or a purchase by the user of a product or service associated with the content item. In some embodiments, the content item is a sponsored content item, such as advertisement, for which an entity receives compensation in exchange for presentation to users. Alternatively, the content item is an organic content item for which an entity does not receive compensation in exchange for presentation to users.

Entities that may present content to users of the online system include content publishers associated with a website or an application for presenting electronic content to groups of users via client devices associated with the users. For example, an entity is the online system that presents sponsored content or organic content to users via one or more communication channels (e.g., websites, applications). As another example, an entity is a third party system presenting content to users of the online system via any suitable communication channel. Accordingly, metrics generated by the online system may describe performance of content presented to users of the online system by the online system itself, or may describe performance of content presented to users of the online system by third party systems external to the online system.

In various embodiments, the online system identifies the exposed group of users as users who were presented with a content item satisfying one or more criteria. For example, the online system identifies the exposed group of users as users who were presented with advertisement presented by a third party system (e.g., a website associated with the third party system or an application associated with the third party system) during a specific time period. Criteria for the content item include: a type of content item, an association between the content item and a particular entity, presentation of the content item by a particular communication channel (e.g., website, application), presentation of the content item by a particular entity, and a time interval for presentation of the content item. In one embodiment, the criteria are specified to the online system by an entity associated with the content item, such as a third party system. For example, the online system receives a description of an advertisement from an entity associated with the advertisement in a request for a metric that also identifies a particular entity presenting the advertisement during a specified time period. In this example, the online system identifies the exposed group as users who viewed the advertisement via the particular entity during the specified time period.

In various embodiments, the online system identifies users of the exposed group based in part on information received by the online system from client devices associated with users. Information received by the online system from a client device includes user identifying information identifying a user associated with the client device and a description of one or more content items presented to the user via the client device. Information describing a content item presented by a client device may include: a content item identifier identifying the content item, an entity identifier identifying entity associated with the content item, a presenting entity identifier that identifies an entity that presented the content item to user via the client device, and a time when the content item was presented by the client device. Based on the received information, the online system identifies the content item, the entity associated with the content item, the presenting entity that presented the content item, and a time the content item was presented to the user via the client device. The online system may store the received information in association with the user and with the content item. When the online system receives a request for a metric including one or more criteria for a content item and retrieves stored information associated with the content item to determine whether stored information associated with the content item satisfies the one or more criteria. For example, the online system determines whether the content item was presented to a user by a specific presenting entity during a specific time period based on the one or more criteria in a request for a metric. If information associated with the content item satisfies the criteria, the online system includes a user corresponding to user identifying information included in information associated with the content item satisfying the criteria in the exposed group. User identifying information may be: a user identifier, a browser identifier, or a client device identifier. For example, the online system compares a client device identifier associated with received information describing a content item presented by a client device to information maintained by the online system associating client devices identifiers with user identifiers associated with users of the online system.

In various embodiments, the online system receives user identifying information and descriptions of content items presented to a user of the online system via a client device from the client devices when the user logs into the online system via the client device. Alternatively, the online system receives user identifying information and descriptions of content items presented to a user of the online system when a specified content item is presented to the user via the client device or at specified time intervals. In some embodiments, user identifying information and descriptions of content items presented to the user of the online system are communicated to the online system by an application executing on a client device presenting a content item to the user executes instructions included in the content item causing the application to communicate the user identifying information and descriptions of content items presented to the user to the online system. In other embodiments, the user identifying information and descriptions of content items presented to a user of the online system are stored at a client device (e.g., in a cookie) associated with a user and are communicated to the online system when a user logs into the online system via the client device or at one or more specified time intervals.

The online system identifies the control group as users who were not presented with the content item presented to the exposed group of users and who have at least a threshold measure of similarity to users in the control group. For example, the online system identifies the control group as users who were not presented with the content item and who have at least a threshold number or a threshold percentage of attributes matching attributes of users in the exposed group. Attributes of a user may include actions performed by the user via the online system or via a third party system, as well as connections between the user and another user or between the user and an object in the online system. In some embodiments, the control group includes users having attributes satisfying at least a threshold number or percentage of targeting criteria associated with the content item presented to each user in the exposed group. For example, the control group includes users having at least a threshold number of attributes satisfying targeting criteria associated with an advertisement that was presented to users in the exposed group. In various embodiments, the online system retrieves a set of attributes associated with users in the exposed group and identifies users associated with at least a threshold number or a threshold percentage of the same or similar attributes as the control group.

To identify the number of conversions associated with the exposed group and the control group, the online system provides information identifying users in the exposed group and users in the control group to a trusted third party system that maintains information describing conversion events. For example, the trusted third party system receives conversion information from one or more entities that identify conversions performed by users and identify the users who performed the conversions to an entity that identified a conversion. The trusted third party also includes information for identifying information identifying a user to an entity identifying conversions to user identifying information used by the online system. In some embodiments, the online system provides the trusted third party system with user identifiers associated with users in the exposed group and user identifiers associated with users in control group to the trusted third party system. The trusted third party system identifies information identifying users to entities identifying conversions corresponding to the user identifiers and identifies conversions identified by various entities identifying conversions using the information identifying users to the entities identifying conversions. In various embodiments, the trusted third party system identifies conversions identified by one or more entities for users included in the exposed group and identifies conversions identified by one or more entities for users included in the control group. For example, the third party system matches user identifiers identifying users of the exposed group to the online system to user identifiers identifying users who performed conversions to one or more entities and matches user identifiers identifying users of the control group to the online system to user identifiers identifying users who performed conversions to one or more entities.

Based on the conversions identified for users in the control group and the conversions identified for users in the exposed group, the trusted third party system generates a metric for the content item. In other embodiments, the trusted third party system provides a number of conversions identified for users in the control group and a number of conversions identified for users in the exposed group to the online system, which generates the metric. In various embodiments, the metric describes an effect of presentation of the content item in causing users to perform conversions. For example, the metric is a difference between a number of conversions associated with the exposed group of users, who were presented with the content item by a particular presenting entity, and a number of conversions associated with the control group of users, who were not presented with the content item by the presenting entity; hence, in this example, the metric identifies a number of conversions attributable to presentation of the content item on by the presenting entity. The metric allows the online system to determine an expected performance of a content item (e.g., when selecting content items for presentation to a user) or provided to an entity associated with the content item to analyze performance of the content item.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
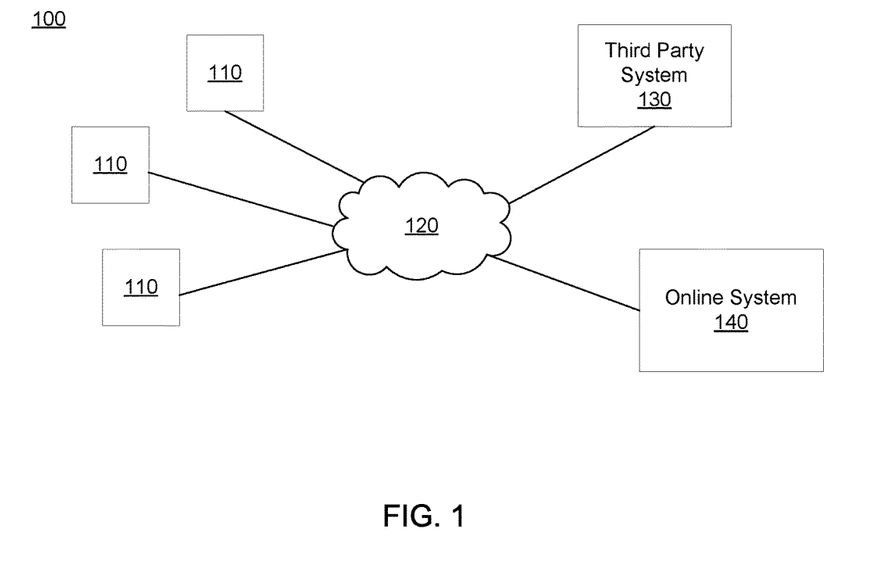
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein may be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content. For example, a third party system 130 provides advertisement requests, which are further described below in conjunction with FIG. 2, including advertisements for presentation and amounts of compensation provided by the third party system 130 for presenting the advertisements to the online system 140. Other types of content may be provided by a third party system 130 to the online system 140 for presentation by the online system 140 in exchange for compensation from the third party system 130 (i.e., "sponsored content"). Sponsored content provided from a third party system 130 to the online system 140 may be associated with the third party system 130 or with an entity (e.g., another third party system 130) on whose behalf the third party system 130 operates.

In some embodiments, one or more of the third party systems 130 is a trusted third party system 130 that analyzes data for the online system 140. For example, a trusted third party system 130 is an entity that receives information describing actions performed by users of the online system 140 from the online system 140 or one or more third party systems 130 external to the online system 140. In various embodiments, the trusted third party system 130 receives information describing actions associated with content presented to users by third party systems 130 or by the online system 140 and identifying users who performed the actions. For example, the trusted third party system 130 receives information identifying a user to a third party system 130 along with an action by the user identified by the third party system 130. The trusted third party system 130 maintains information identifying information identifying a user to a third party system 130 associated with information identifying the user to the third party system 130, allowing the trusted third party system 130 to correlate actions identified by a third party system 130 with a user of the online system 140. As further described below in conjunction with FIGS. 3-5 the trusted third party system 130 may generate information describing numbers of one or more actions performed by online system users identified by the third party systems 130 to evaluate performance of one or more content items in causing online system users to perform the one or more actions.

Figure 2:
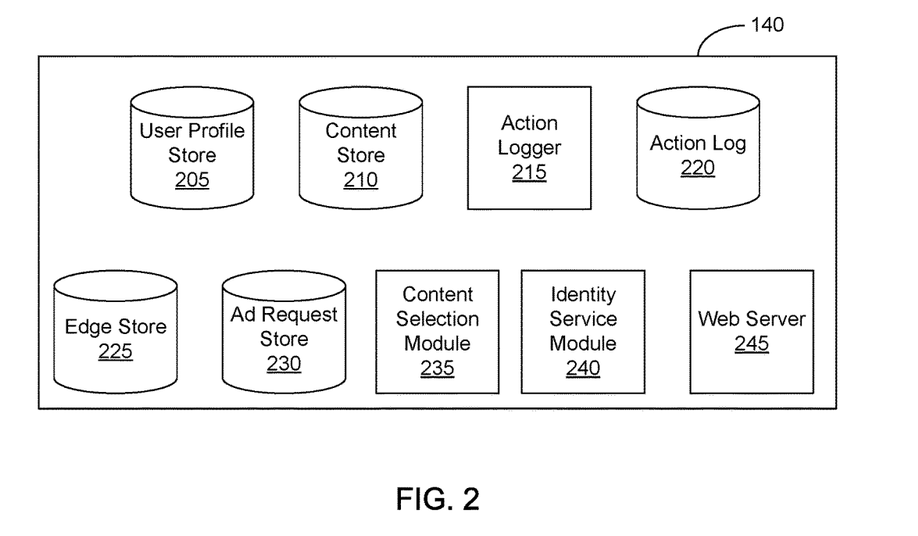
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an advertisement ("ad") request store 230, a content selection module 235, a location store 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

In some embodiments, the action logger 215 receives communications about user actions with content presented to a user and populates the action log 220 with information about the actions. Examples of interactions with content include viewing content items, requesting additional content items for presentation, indicating a preference for a content item, sharing a content item with another user, or performing any other suitable action. A user may interact with content items by providing inputs to a client device 110 presenting content from the online system 140. The client device 110 identifies actions corresponding to various provided inputs and communicates information describing the identified actions to the action logger 215, which stores the information describing the identified actions in the action log 220.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, numbers of comments posted by a user about an object, or types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An ad request includes advertisement content, also referred to as an "advertisement," and a bid amount. The advertisement is text, image, audio, video, or any other suitable data presented to a user. In various embodiments, the advertisement also includes a landing page specifying a network address to which a user is directed when the advertisement content is accessed. The bid amount is associated with an ad request by an advertiser and is used to determine an expected value, such as monetary compensation, provided by the advertiser to the online system 140 if an advertisement in the ad request is presented to a user, if a user interacts with the advertisement in the ad request when presented to the user, or if any suitable condition is satisfied when the advertisement in the ad request is presented to a user. For example, the bid amount specifies a monetary amount that the online system 140 receives from the advertiser if an advertisement in an ad request is displayed. In some embodiments, the expected value to the online system 140 for presenting the advertisement may be determined by multiplying the bid amount by a probability of the advertisement being accessed by a user.

Additionally, an ad request may include one or more targeting criteria specified by the advertiser. Targeting criteria included in an ad request specify one or more characteristics of users eligible to be presented with advertisement content in the ad request. For example, targeting criteria are used to identify users associated with user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have performed a particular action, such as having sent a message to another user, having used an application, having joined or left a group, having joined an event, having generated an event description, having purchased or reviewed a product or service using an online marketplace, having requested information from a third party system 130, having installed an application, or having performed any other suitable action. Including actions in targeting criteria allows advertisers to further refine users eligible to be presented with advertisement content from an ad request. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the online system 140 and based on the user's affinity for different content items. Information associated with the user included in the user profile store 205, in the action log 220, and in the edge store 225 may be used to determine the measures of relevance. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include advertisements from ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects advertisements from ad requests associated with a maximum expected value or associated with at least a threshold expected value for presentation. An expected value associated with an ad request or with a content item represents an expected amount of compensation received by the online system 140 for presenting an advertisement from the ad request or the content item. For example, the expected value associated with an ad request is a product of the ad request's bid amount and a likelihood of the user interacting with the advertisement content from the ad request. The content selection module 235 may rank ad requests based on their associated bid amounts and select advertisements from ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 235 receives a request to present a feed of content to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user. For example, information describing actions associated with other users connected to the user or other data associated with users connected to the user is retrieved and used to select content items, such as content items describing actions associated with one or more of the other users. Additionally, one or more advertisement requests ("ad requests") may be retrieved from the ad request store 230. The retrieved ad requests and other content items are analyzed by the content selection module 235 to identify candidate content items, including ad requests, eligible for presentation to the user. For example, content items associated with users who not connected to the user or content items associated with users for whom the user has less than a threshold affinity are discarded as candidate content items. Based on various criteria, the content selection module 235 selects one or more of the content items or ad requests identified as candidate content for presentation to the user. The selected content items or advertisements from selected ad requests are included in a feed of content that is presented to the user. For example, the feed of content includes at least a threshold number of content items describing actions associated with users connected to the user via the online system 140.

In various embodiments, the content selection module 235 presents content to a user through a feed including a plurality of content items selected for presentation to the user. One or more advertisements may also be included in the feed. The content selection module 235 may also determine an order in which selected content items or advertisements are presented via the feed. For example, the content selection module 235 orders content items or advertisements in the feed based on likelihoods of the user interacting with various content items or advertisements.

The identity service module 240 identifies online system users to whom one or more specific content items were presented by various presenting entities (e.g., the online system 140, one or more third party systems 130) as an exposed group of users. In various embodiments, the identity service module 240 receives information from a third party system 130 describing a content item and one or more criteria for presentation of the content item and identifies users to whom presentation of the content item satisfies at least a threshold number of criteria based on information stored in the action log 220 as included in the exposed group. Criteria for presentation of the content item include: a type of content item, an association between the content item and a particular entity (e.g., third party system 130, online system 140), presentation of the content item by a particular communication channel (e.g., website, application), presentation of the content item by a particular entity, and a time interval for presentation of the content item. In some embodiments, the criteria are specified to the online system 140 by an entity associated with the content item. For example, the online system 140 receives a request to generate a metric that identifies an advertisement, a third party system 130 on which the advertisement was presented, and a time interval when the advertisement was presented. In this example, the identity service module 240 identifies an exposed group of users as users who were presented with the advertisement by the identified third party system 130 within the time interval. In other embodiments, the criteria are specified to the online system 140 by a third party system 130 other than an entity associated with a content item. For example, the online system 140 receives a description of a content item and one or more criteria from a third party system 130 not associated with the content item that compiles information describing actions performed by users.

The identity service module 240 also identifies a non-exposed group of users consisting of users of the online system 140 to whom the content item presented to each user in the exposed group of users was not presented. For example, the non-exposed group of users includes users of the online system 140 for whom the online system 140 did not receive information from client devices 110 indicating the content item was presented to the users within a particular time interval. Additionally, the identity service module 240 determines measures of similarity between users in the non-exposed group and users in the exposed group and identifies a control group of users as users from the non-exposed group with at least a threshold measure of similarity to users in the exposed group. A measure of similarity between a user in the exposed group and a user in the non-exposed group may be based on a number or a percentage of attributes of the user in the exposed group matching attributes of the user in the non-exposed group. In some embodiments, the identity service module 240 compares attributes associated with users in the exposed group of users to attributes associated with users in the non-exposed group of users and identifies a control group as users in the non-exposed group having at least a threshold number or a threshold percentage of attributes matching attributes of users in the exposed group. In other embodiments, the identity service module 240 computes a similarity score for a user in the non-exposed group based on attributes of the user and attributes of users in the exposed group and includes the user in the control group if the user's similarity score equals or exceeds a threshold value. Hence, the control group includes users who were not presented with the content item presented to users in the exposed group and who have at least a threshold measure of similarity to users in the control group.

The identity service module 240 determines information identifying users in the exposed group to the online system 140 and determines information identifying users in the control group to the online system 140. For example, based on information in the action log 220 and in the user profile store 210, the identity service module 240 determines user identifiers associated with each user in the exposed group and associated with each user in the control group. In some embodiments, the action log 220 includes information received from a client device 110 that presented the content item to a user, while the user profile store 205 includes information associating user identifiers with different information received from client devices 110 associated with the user. Hence, the identity service module 240 retrieves the information received from the client device 110 that presented the content item to the user and determines a user identifier associated with the information received from the client device 110 that presented the content item to the user from the user profile store 210. Information identifying a user to the online system 140 may be a user identifier associated with the user by the online system 140, a device identifier of a client device 110 associated with the user, an identifier of an application executing on the client device 110 that presented the content item to the user, or any other suitable information.

The identity service module 240 communicates information used by the online system 140 to identify users in the control group and information used by the online system 140 to identify users in the exposed group to a trusted third party system 130 that maintains information describing actions performed by users that were identified by other third party systems 130. In various embodiments, the identity service module 240 obfuscates information identifying users in the control group to the online system 140 and obfuscates information identifying users in the exposed group to the online system 140 and transmits the obfuscated information to the trusted third party system 130. For example, the identity service module 240 hashes a user identifier associated with a user by the online system 140 and transmits the hashed user identifier to the trusted third party system 130. Transmission of information used by the online system 140 to identify users to a trusted third party system 130 is further described below in conjunction with FIG. 3.

The web server 245 links the online system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the online system 140 and the client device 110; for example, the messages are instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 245 may provide application programming interface (API) functionality to send data directly to native client device operating systems, such as IOS®, ANDROID™, or BlackberryOS.

Figure 3:
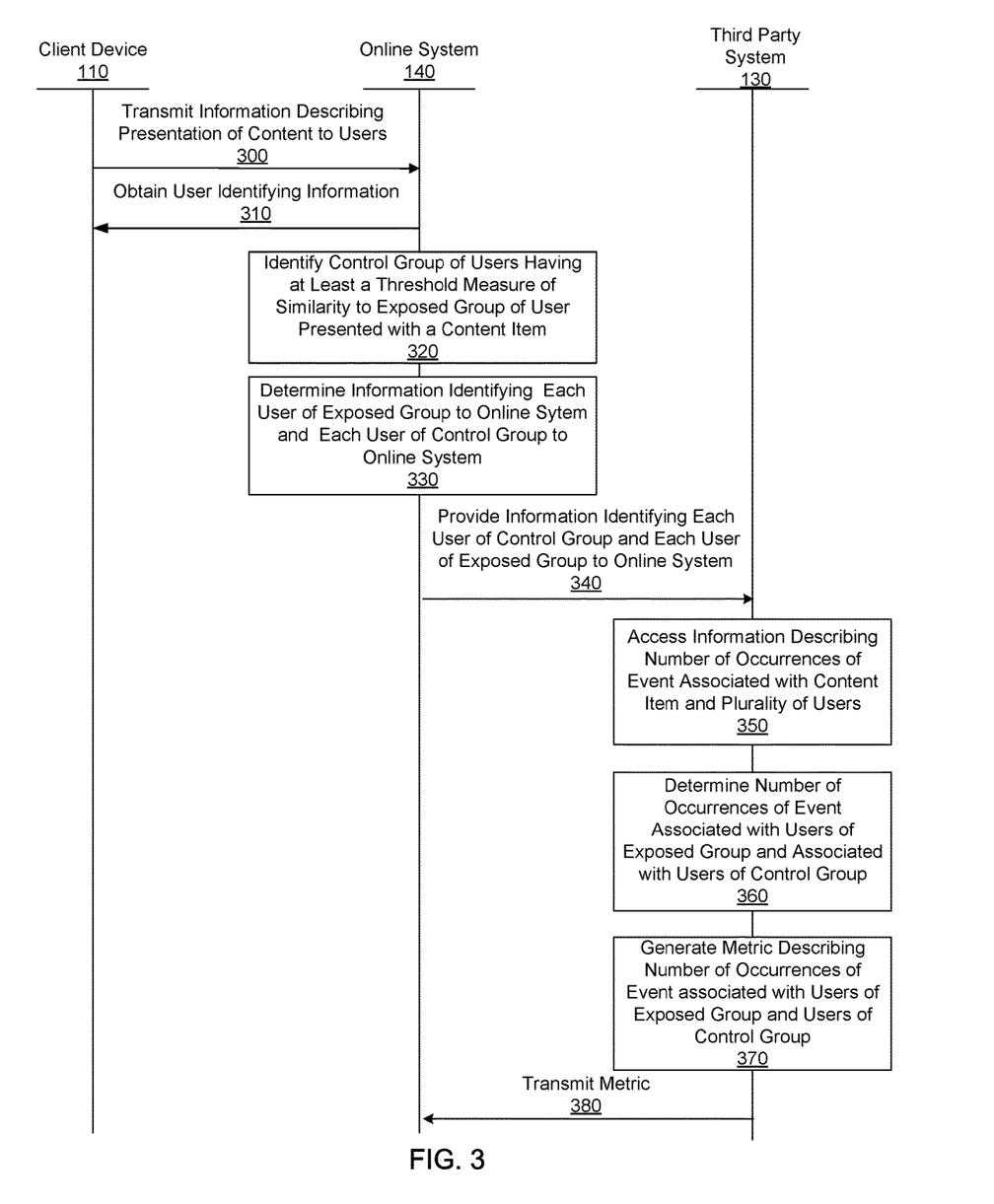
FIG. 3 is an interaction diagram of a method for measuring performance of content presented to users of an online system based on events associated with users presented with the content and events associated with users not presented with the content and having at least a threshold measure of similarity to the users presented with the content, in accordance with an embodiment.

Measuring Performance of Content Presented on an Online System Based on a Actions by Users Presented with the Content and Actions by Similar Users not Presented with the Content FIG. 3 is an interaction diagram of a method for measuring performance of a content item presented to users of an online system 140 based on actions by users presented with the content item and actions by associated with users not presented with the content and having at least a threshold measure of similarity to the users presented with the content item. In other embodiments, the method may include different and/or additional steps than those shown in FIG. 3. Additionally, steps of the method may be performed in different orders than the order described in conjunction with FIG. 3 in various embodiments.

Client devices 110 that presented a content item to users of the online system 140 transmit 300 information describing the content item, and the online system obtains 310 user identifying information used by the online system 140 to identify users from the client devices 110. For example, a client device 110 presenting the content item to a user transmits 310 information describing the content item, and the online system 140 obtains 310 information identifying the user to the online system 140 from the client device 110. As content items are presented to users of the online system 140 via the online system 140, or via third party systems 130 that communicate with the online system, client devices 110 presenting the content items transmit 300 information describing the content items, and the online system obtains 310 information identifying users of the client devices 110 to the online system 140 ("user identifying information") from the client devices 110. Hence, the online system 140 maintains information describing content items presented to various online system users.

Content items presented to users of the online system 140 may be content items for which the online system 140 or another entity receives compensation for presenting, referred to herein as "advertisements" or "sponsored content items." Alternatively, content items presented to online system users may be content items for which the online system 140 or another entity does not receive compensation for presenting, also referred to herein as "organic content items." Various entities may present content items to online system users via client devices 110. Example entities include the online system 140 and third party systems 130 external to the online system. Content items may be presented via client devices 110 through various applications executing on the client devices 110 or through websites or other content accessed via client devices 110.

Information describing a content item presented to an online system user via a client device 110 identifies the content item, a time the content item was presented to the user, and an identifier of a presenting entity that presented the content item to the user via the client device 110. For example, information describing an advertisement presented to a user via a website displayed on a client device 110 includes an identifier of the advertisement, a time the client device 110 presented the advertisement, and an identifier of the website on which the advertisement was presented. In various embodiments, the information describing a content item presented to an online system user includes an identifier associated with the content item, and the online system 140 retrieves information describing the content item from the online system 140 or from a third party system 130 using the identifier associated with the content item. Example information associated with a content item includes: subject matter of the content item, types of content (image data, video data, etc.) in the content item, targeting criteria associated with the content item, a bid amount associated with the content item, an entity associated with the content item, and any other suitable information.

A client device 110 may transmit 300 information describing a content item presented to a user of the online system 140 via the client device 110 in response to the client device 110, or an application executing on the client device 110, executing instructions in the content item that, when executed by the client device 110, cause the client device 110 to communicate information describing the content item to the online system 140. For example, when a browser executing on a client device 110 presents an advertisement to an online system user, the browser executes instructions in the advertisement causing the client device 110 to transmit 300 a description the advertisement to the online system 140. Alternatively, a client device 110 locally stores information describing a content item presented to an online system user and transmits 300 the information describing the content item to the online system 140 when the user logs into the online system 140 via the client device 110 or at specified time intervals. For example, when a user logs into the online system 140 via a client device 110, the client device 110 transmits 310 one or more cookies stored on the client device 110 by an application (e.g., a web browser) executing on the client device 110 describing content items presented to the user by the application.

The online system 140 obtains 310 user identifying information from client devices 110 that presented content items to users of the online system 140. User identifying information obtained 310 from a client device 110 allows the online system 140 to identify a user profile or a user identifier associated with a user associated with the client device 110 by the online system 140. In various embodiments, user identifying information obtained 310 from a client device 110 includes a user identifier associated with the user by the online system 140, a browser identifier, or a client device identifier allowing the online system 140 to identify a user of the online system 140 associated with the client device 110 based on information maintained by the online system 140. For example, the online system 140 maintains a user profile for each user of the online system 140 that includes a user identifier and one or more client device identifiers associated with the user identifier, allowing the online system 140 to identify a user identifier from a client device identifier.

In some embodiments, the online system 140 obtains 310 user identifying information from a client device 110 when a user of the online system 140 logs into the online system 140 via the client device 110. Alternatively, the online system 140 obtains 310 user identifying information from a client device 110 at specific time intervals. In other embodiments, the client device 110 transmits user identifying information to the online system 140 when the client device 110 transmits 300 information describing a content item presented to an online system user by the client device 110. The online system 140 may store the user identifying information on a client device 110 when a user installs an application associated with the online system 140 on the client device 110 or when the user accesses certain content provided by the online system 140 via the client device 110.

From the information describing content items presented to various users of the online system 140, the online system 140 identifies a group of users to whom a content item was presented, also referred to herein as an "exposed group" of users. For example, the online system 140 receives an identifier of a content item or characteristics of a content item from a third party system 130 and identifies an exposed group of users to whom the content item (or a content item having characteristics matching the received characteristics) was presented by one or more client devices 110 based on information received from various client devices 110 by the online system 140. Alternatively, the online system 140 identifies a content item (or identifies characteristics of a content item) and, based on information maintained by the online system 140, identifies the exposed group as users who were presented with the client device (or with a content item having characteristics matching the identified characteristics) based on information received from various client devices 110. The content item may be identified to the online system 140 before the content item is presented or after the content item has been presented to one or more users of the online system 140. Example characteristics for identifying a content item include: an entity associated with the content item, a product or a service associated with the content item, a type of content (e.g., video data, image data) included in the content item, an object maintained by the online system 140 associated with the content item, or other suitable data.

When identifying the exposed group of users, the online system 140 may determine whether presentation of the content item to various users satisfied one or more criteria. Hence, the exposed group of users includes users to whom the content item was presented and for whom presentation of the content item satisfied at least a threshold number of the one or more criteria. Example criteria for presentation of a content item include: a presenting entity that presented the content item to one or more users, a type of client device 110 that presented the content item to users, a type of communication channel that presented the content item (e.g., application, website), and a time when the content item was presented. For example, the online system 140 identifies the exposed group of users as users who were presented with an identified content item by a specific website within a specific time interval. To determine whether presentation of a content item to a user satisfies criteria for presentation of the content item, the online system 140 compares received information from a client device 110 describing presentation of the content item to the one or more criteria for presentation of the content item. The online system 140 may receive the one or more criteria for presentation of a content item from a third party system 130 or may determine the one or more criteria for presentation of the content item itself.

The online system 140 also identifies 320 a control group of users consisting of users who were not presented with the content item and who have at least a threshold measure of similarity to users of the exposed group of users. In various embodiments, users of the control group were not presented with the content item within a threshold time interval from a time when the content item was presented to a user of the exposed group and have at least a threshold measure of similarity to users of the exposed group. The online system 140 may identify 320 the control group by determine measures of similarity between users who were note presented with the content item and users of the exposed group. For example, a measure of similarity between a user and another user is based on a number or a percentage of attributes of the user maintained by the online system 140 matching attributes of the other user maintained by the online system 140. Hence, users of the control group were not presented with the content item within a threshold time of a time when the content item was presented to users of the exposed group and have at least a threshold number or a threshold percentage of attributes matching attributes of users of the exposed group. In some embodiments, the online system 140 associates weights with different users of the control group of users. A weight associated with a user of the control group may be based on a measure of similarity between the user of the control group and users of the exposed group of users; for example, higher weights are associated with users of the control group having higher measures of similarity to users of the exposed group. As described above in conjunction with FIG. 2, attributes of a user include demographic information associated with the user, actions performed by the user via the online system 140 or via one or more third party systems 130, and connections between the user and other users or objects.

In some embodiments, the online system 140 identifies 320 the control group based on targeting criteria associated with the content item. For example, the online system 140 identifies 320 a control group consisting of users who were not presented with the content item and who have at least a threshold number or a threshold percentage of attributes satisfying targeting criteria associated with the content item. If the content item is an advertisement, the online system 140 identifies 320 a control group consisting of users who are eligible to be presented with the advertisement but who were not presented with the advertisement. In some embodiments, the online system 140 identifies 320 the control group so at least a threshold number or percentage users of the control group have common attributes matching at least a threshold number of percentage of common attributes of users of the exposed group.

In various embodiments, the online system 140 identifies 320 the control group by initially identifying a group of users to whom the content item was not presented (or to whom presentation of the content item did not satisfy at least one or more criteria for presentation), also referred to herein as a "non-exposed" group of users. For example, the online system 140 identifies a non-exposed group of users consisting of users associated with one or more client devices 110 from which the online system 140 did not receive information describing presentation of the content item by the client devices 110. The online system 140 determines measures of similarity between users of the non-exposed group and users in the exposed group and identifies 320 the control group as users of the non-exposed group having at least a threshold measure of similarity to users of the exposed group. In other embodiments, the online system 140 determines measures of similarity between various users and users of the exposed group and identifies users having at least the threshold measure of similarity to users of the exposed group then selects users from the identified users who were not presented with the content item or for whom presentation of the content item did not satisfy at least the threshold number of criteria for presentation as the control group. The online system 140 may identify 320 the control group based on attributes of users of the exposed group as further described in U.S. patent application Ser. No. 13/297,117, filed on Nov. 15, 2011, and in U.S. patent application Ser. No. 14/290,355, filed on May 29, 2014, each of which is hereby incorporated by reference in its entirety, in various embodiments.

The online system 140 determines 330 information identifying each user of the exposed group to the online system 140 and information identifying each user of the control group to the online system 140 based at least in part on information maintained by the online system 140 and information received from client devices 110 presenting the content item. In various embodiments, the online system 140 matches user identifying information obtained 310 from a client device 110 associated with a user of the exposed group of users with information maintained by the online system 140 associating information identifying users to the online system 140 with various user identifying information. For example, the online system 140 maintains information associating a user identifier associated with a user by the online system with other user identifying information (e.g., device identifiers, application identifiers, etc.). To determine 330 information identifying a user of the exposed group to the online system 140, the online system identifies a user associated with a user by the online system 140 that is associated with user identifying information obtained 310 from a client device 110 associated with a user to whom the content item was presented. The online system 140 also identifies user identifiers associated with users of the control group maintained by the online system 140.

The online system 140 provides 340 information identifying each user of the exposed group of users to the online system 140 and information used by the online system 140 to identify each user of the control group of users to a trusted third party system 130. The trusted third party system 130 receives information from various other third party systems 130 identifying actions performed by users of the online system 140 identified by one or more of the other third party systems 130 or by the online system 140 and stores the information identifying actions performed by users. Additionally, the trusted third party system 130 maintains information correlating information used by the online system 140 to identify users with information used by various third party systems 130 to identify users, allowing the trusted third party system 130 to correlate actions identified by third party systems 130 that are associated with information used by the third party systems 130 to identify users with information used by the online system 140 to identify users. For example, the third party system 130 includes a translation key or index mapping information used by a third party system 130 to identify a user with corresponding information used by the online system 140 to identify the user. In various embodiments, the online system 140 obfuscates information used by the online system 140 to identify a user and provides the obfuscated used by the online system 140 to identify the user to the trusted third party system. For example, the online system 140 hashes a user identifier associated with a user of the target group by the online system 140 and provides 340 the hashed use identifier associated with the user by the online system 140 to the third party system 130.

Figure 4:
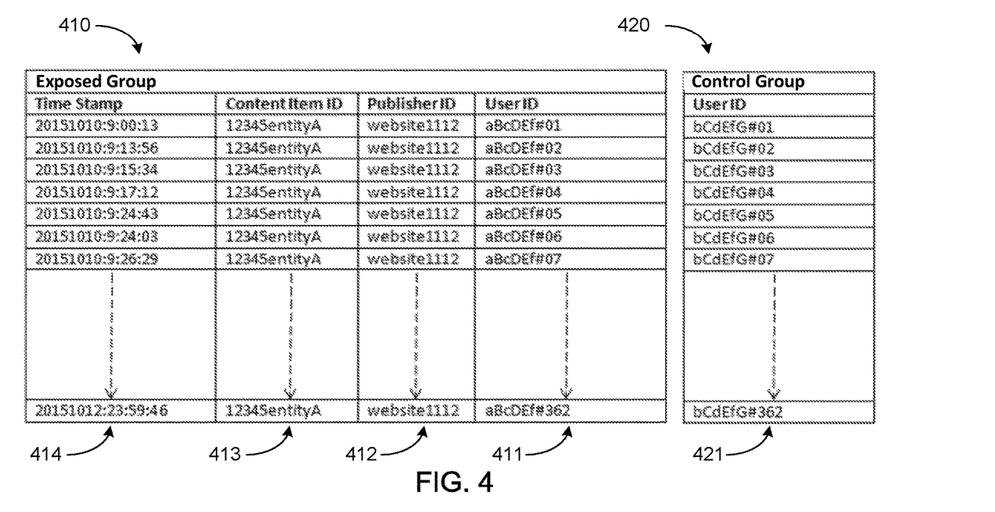
FIG. 4 is an example of information identifying users of an online system presented with a content item and identifying users of the online system not presented with the content item provided to a trusted third party system by the online system, in accordance with an embodiment.

In some embodiments, the online system 140 provides information describing presentation of the content item to users of the exposed group along with information used by the online system 140 to identify each user in the exposed group and in the control group. For example, the online system 140 provides 340 the trusted third party system 130 with a presenting entity identifier identifying an entity that presented the content item to a user of the exposed group and a time when the content item was presented to the user of the exposed group along with information used by the online system 140 to identify the user of the exposed group. FIG. 4 is an example of information provided by the online system 140 to the trusted third party system 130. In the example of FIG. 4, the online system 140 provides 340 the trusted third party with a table 410 including information 411 used by the online system 140 to uniquely identify each user of the target group and an additional table 420 including information 421 used by the online system 140 to uniquely identify each user of the control group. The table 410 also includes a presenting entity identifier 412, a content item identifier 413, and a time 414 when the content item corresponding to the content item identifier 413 associated with information 411 used by the online system 140 to uniquely identify a user of the target group. However, in other embodiments, the table 410 may include any other suitable information or may include less information than that described in conjunction with FIG. 4. For example, if weights are associated with users of the control group, the table 410 includes a weight associated with a user of the control group. Information included in the table 410 or in the additional table 420 in various embodiments by the online system 140 may depend on information available to the online system 140, characteristics of the content item, or any other suitable information. While FIG. 4 shows an example where the online system 140 provides 340 tables including information identifying information used by the online system 140 to identify users of the control group and of the test group, in other embodiments, the online system 140 uses any suitable format (e.g., an index, a spreadsheet) to provide information identifying information used by the online system 140 to identify users of the control group and of the test group to the trusted third party system 130.

The trusted third party system 130 may be a data analytics provider or other entity that tracks conversions associated with content items presented by various entities, such as third party systems 130 or the online system 140. In some embodiments, the trusted third party system 130 receives information describing events where a user performed an action that was identified by an entity, such as a third party system 130 or the online system 140. Information describing an event may identify the action performed by a user and information used by the third party system 130 that identified the action to identify the user who performed the action. The trusted third party system 130 may receive information describing different events from different third party systems 130. Additionally, an entity may transmit information describing certain events identified by the entity to the trusted third party system 130.

The trusted third party system 130 accesses 350 information received from entities describing events and determines 360 a number of occurrences of one or more events associated with users of the control group and associated with users of the exposed group based on the information provided 340 to the trusted third party system 130 by the online system 140. In various embodiments, the trusted third party system 130 determines 360 a number of conversions associated with users of the control group and a number of conversions associated with users of the exposed group from the received information describing events identified by entities. A conversion is an event associated with the content item as an objective for presentation of the content item Examples of conversions include: a location of a user being within a threshold distance of a location associated with a content item, a user accessing a website associated with a content item, a user accessing the content item, a user indicating a preference for a content item, a user downloading an application associated with a content item, a user purchasing a product or a service associated with a content item, a user accessing an object associated with the content item, or a user performing any other suitable action associated with the content item. For example, the trusted third party system 130 accesses 350 information describing events received from various entities, identifies events matching a conversion associated with the content item, and, based on the information provided 340 by the online system 140 and information correlating information used by the online system 140 to identify users with information used by various third party systems 130 to identify users, the trusted third party system 130 determines 360 a number of conversions associated with users of the exposed group and a number of conversions associated with users of the control group.

For example, the trusted third party system 130 compares received information used by a third party system 130 to identify a user to information correlating information used by the online system 140 to identify a user with information used by the third party system to identify the user. If the trusted third party system 130 includes information correlating the information used by the third party system 130 to identify the user with information used by the online system 140 to identify the user, the trusted third party system 130 associates events associated with the information used by the third party system 130 to identify the user with the information used by the online system 140 to identify the user. Hence, if the trusted third party system 130 received information identifying an event that includes information used by an entity to identify a user that is correlated with information used by the online system 140 to identify a user in the target group, the trusted third party system 130 associates the event with users of the target group. Similarly, if the trusted third party system 130 received information identifying an event that includes information used by an entity to identify a user that is correlated with information used by the online system 140 to identify a user in the control group, the trusted third party system 130 associates the event with users of the control group.

Based on the determined number of occurrences of an event (e.g., a conversion) associated with users of the exposed group and the determined number of occurrences the event associated with users of the control group, the third party system 130 generates 370 a metric describing the number of occurrences of event associated with users of the exposed group and the number of occurrences of the event associated with users of the control group. For example, the generated metric is a percentage difference between the number of occurrences of the event associated with users of the exposed group and the number of occurrences the event associated with users of the control group or is a difference between the number of occurrences of the event associated with users of the exposed group and the number of occurrences of the event associated with users of the control group. In various embodiments, the metric describes a number or percentage of occurrences of the event attributable to presenting the content item to users of the exposed group based on a difference between the number of occurrences of the event associated with users of the exposed group and the number of occurrences the event associated with users of the control group. For example, if the third party system 130 determines 360 300 conversions are associated with users of the exposed group and 100 conversions are associated with users of the control group, the metric indicates 200 conversions are attributable to presentation of the content item. In this example, since the content item was not presented to any user of the control group, the metric describes a 100% increase in conversions from presenting the content item.

Figure 5:
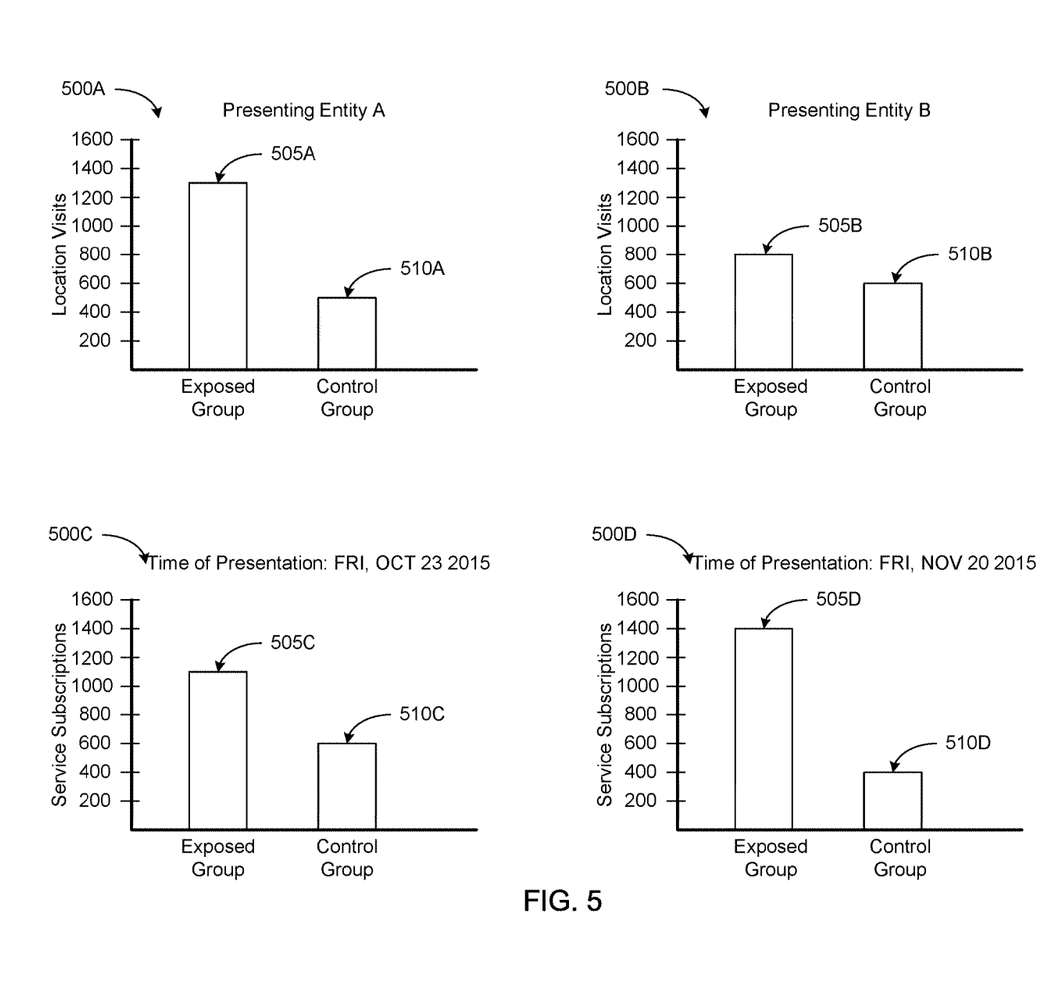
FIG. 5 is an example of metrics describing performance of content presented to online system users based on a number of occurrences of an event by users presented with the content and a number of occurrences of the event by users who were note presented with the content, in accordance with an embodiment.

In various embodiments, the metric may also describe a number or percentage of conversions attributable to presentation of the content item by a particular presenting entity, presentation of the content item by a particular communication channel (e.g., website, application), presentation of the content item during a particular time interval, or any other suitable criteria. In the example of FIG. 5 the third party system 130 generates 370 metrics 500A-D describing a number of conversions attributable to presentation of a content item by different presenting entities 500A-B or during different time intervals 500C-D. The third party system 130 may transmit 380 the generated metrics 500A-D to the online system 140 or to an entity associated with the content item. For purposes of illustration, FIG. 5 shows a number of conversions associated with an exposed group of users 505A-D and with a control group of users 510A-D with each metric 500A-D.

To generate metric 500A, the trusted third party system 130 generates 370 a histogram describing 1,300 conversions associated with users of the exposed group of users 505A and 500 conversions associated with users of the control group of users 510A. Based on the histogram, the trusted third party system 130 generates 370 is metric 500A. For example, metric 500A is a difference between the 1,300 conversions associated with users of the exposed group of users 505A and 500 conversions associated with users of the control group of users 510A, which indicates that 800 conversions are attributable to presentation of the content item by Presenting Entity A. In other embodiments, the trusted third party system 130 transmits 380 the histogram to the online system 140 or to another entity, such as an entity associated with the content item, and the online system 140 or the other entity generates metric 505A.

Similarly, the trusted third party system 130 generates 370 metric 500B based on a histogram describing 800 conversions associated with users of the exposed group of users 505B and 600 conversions associated with users of the control group of users 510B. In one example, the metric 500B is a difference between the 800 conversions associated with users of the exposed group of users 505B and the 600 conversions associated with users of the control group of users 510B, which indicates 200 conversions are attributable to presenting the content item via Presenting Entity B. To generate 370 metric 500C, the trusted third party system 130 generates 370 a histogram describing 1,100 conversions associated with users of the exposed group of users 505C and 600 conversions associated with users of the control group of users 510C. In one embodiment, metric 500C is a difference between the 1,100 conversions associated with users of the exposed group of users 505C and the 600 conversions associated with users of the control group of users 510C to identify a number of conversions attributable to presenting the content item on Friday, Oct. 23, 2015. The trusted third party system 130 generates 370 metric 500D as a difference between 1,400 conversions associated with users of the exposed group of users 505D and 400 conversions associated with users of the control group of users 510D, to provide a number of conversions attributable to presenting the content item on Friday, Nov. 20, 2015.

In various embodiments, the trusted third party system 130 transmits 380 the metric describing the number of conversions associated with the exposed group of users and the number of conversions associated with the control group of users to the online system 140. The online system 140 may use the metric to determine an expected performance of a content item. For example, when selecting content items for a user, the online system 140 may account for expected performance of various content items based on metrics generated for the content items as further described above. In other embodiments, the online system 140 or the trusted third party system 130 provides the metric to an entity associated with the content item, allowing the entity to evaluate performance of presenting the content item. For example, the online system 140 provides the metric to an entity from which the online system 140 received a request for metric for the content item. Alternatively, the trusted third party system 130 provides the metric to the entity associated with the content item.

In various aspects, the trusted third party system 130 generates multiple metrics for presentation of a content item satisfying criteria for presentation. For example, the trusted third party system 130 generates a metric based on presentation of a content item to users via a providing entity (e.g., a website) and generates an additional metric based on presentation of the content item to users via an alternative providing entity (e.g., another website). The trusted third party system 130 provides the metric and the additional metric to an entity associated with the content item, allowing the entity to determine effectiveness of presenting the content item via the providing entity relative to presenting the content item via the alternative providing entity. As another example, the trusted third party system 130 generates a metric based on presentation of a content item to users during a particular time interval and generates an additional metric based on presentation of the content item to users via an alternative time interval. The trusted third party system 130 provides the metric and the additional metric to an entity associated with the content item, allowing the entity to determine effectiveness of presenting the content item during the particular time interval relative to presenting the content item during the alternative time interval.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    storing, by a social networking server of an online system, an edge store storing connections between users of the online system;
    receiving, at the online system, information describing a content item presented to each user of an exposed group of users of the online system via a client device associated with each user in the exposed group, the information including a time of presentation of the content item to each user in the exposed group;
    obtaining user identifying information from the client device associated with each user of the exposed group of users;
    identifying a non-exposed group of users of the online system outside of the exposed group of users;
    generating a measure of similarity between the exposed group of users and each of the non-exposed group of users based on stored attributes including the stored connections between users in the edge store of the social networking server;
    determining information identifying a control group of users as a subset of the non-exposed group of users having at least a threshold measure of similarity to one or more users of the exposed group of users;
    generating hashes of the user identifying information for the exposed group of users and the information identifying the control group of users to obfuscate identities of the exposed group of users and the control group of users;
    providing the hashes to a third party system, the third party system:
    accessing information describing a number of occurrences of an event associated with the content item and information identifying each of a plurality of online system users associated with the event,
    determining a number of occurrences of the event associated with the users of the exposed group of users and a number of occurrences of the event associated with the users of the control group of users based at least in part on the hashes and the accessed information, and
    generating a metric describing the number of occurrences of the event associated with the exposed group of users and the number of occurrences of the event associated with the control group of users, wherein the metric is based at least in part on a difference between the number of occurrences of the event associated with the users of the exposed group of users and the number of occurrences of the event associated with the users of the control group of users.

2. The method of claim 1, wherein the metric is based at least in part on a difference between the number of occurrences of the event associated with the users of the exposed group of users and the number of occurrences of the event associated with the users of the control group of users.

3. The method of claim 1, wherein the content item comprises an advertisement.

4. The method of claim 1, wherein each user of the control group of users satisfies one or more targeting criteria associated with the content item.

5. The method of claim 1, wherein the threshold measure of similarity is based at least in part on a threshold number of attributes associated with a user of the control group matching attributes associated with users of the exposed group of users.

6. The method of claim 5, wherein the attribute associated with the user of the control group of users is selected from a group consisting of: an action performed by the user of the control group of users on the online system, an action performed by the user of the control group of users on a third party system, a connection between the user of the control group of users and an additional user of the online system, a connection between the user of the control group of users and an object on the online system, and any combination thereof.

7. The method of claim 5, wherein the attribute associated with the user of the control group of users is selected from a group consisting of: an age of the user of the control group of users, a gender of the user of the control group of users, a geographic area associated with the user of the control group of users, and any combination thereof.

8. The method of claim 1, wherein identifying the control group of users having at least the threshold measure of similarity to the users of the exposed group of users comprises:
comparing attributes of each of a plurality of users user who were not presented with the content item within at least the threshold interval of time from the time of presentation of the content item to one or more users of the exposed group of users to attributes of one or more users of the exposed group of users;
computing a similarity score for each user of the plurality of users, the similarity score for a user of the plurality of users based on the comparison of attributes of the plurality of the users to attributes of one or more users of the exposed group of users; and
identifying, the control group of users as users of the plurality of users having at least a similarity score equaling or exceeding the threshold measure of similarity.

9. The method of claim 8, wherein an attribute associated with one or more users of the exposed group of users comprises an attribute shared by at least a threshold number of the users of the exposed group of users.

10. The method of claim 1, wherein the event is selected from a group consisting of: a location of a user of the online system being within a threshold distance of a location associated with the content item, the user of the online system accessing a website associated with a content item, the user of the online system accessing the content item, the user of the online system indicating a preference for the content item, the user of the online system downloading an application associated with the content item, the user of the online system purchasing a product or a service associated with the content item, the user accessing an object maintained by the online system and associated with the content item, and any combination thereof.

11. The method of claim 1, wherein the information describing the number of occurrences of the event associated with the content item and information identifying each of the plurality of online system users associated with the event comprises information received from one or more entities.

12. The method of claim 1, wherein determining the number of occurrences of the event associated with the users of the exposed group of users and the number of occurrences of the event associated with the users of the control group of users comprises:
retrieving information correlating information identifying users of the online system with information identifying users to an entity that provided at least a set of the accessed information;
determining information identifying users of the online system correlated with information identifying users to the entity based on the retrieved information;
determining the number of occurrences of the event associated with the users of the exposed group of users based at least in part on a number of occurrences of the event associated with information identifying users to the entity correlated with information identifying users of the exposed group to the online system; and
determining the number of occurrences of the event associated with the users of the control group of users based at least in part on a number of occurrences of the event associated with information identifying users to the entity correlated with information identifying users of the control group to the online system.

13. A method comprising:
storing, by a social networking server of an online system, an edge store storing connections between users of the online system;
receiving, at the online system, information describing a content item presented to each user of an exposed group of users of the online system via a client device associated with each user in the exposed group, the information including a time of presentation of the content item to each user in the exposed group;
obtaining user identifying information from the client device associated with each user of the exposed group of users;
identifying a non-exposed group of users of the online system outside of the exposed group of users;
generating a measure of similarity between the exposed group of users and each of the non-exposed group of users based on stored attributes including the stored connections between users in the edge store of the social networking server;
determining information identifying a control group of users as a subset of the non-exposed group of users having at least a threshold measure of similarity to one or more users of the exposed group of users;
generating hashes of the user identifying information for the exposed group of users and the information identifying the control group of users to obfuscate identities of the exposed group of users and the control group of users;
providing the hashes to a third party system, wherein the third party system generates a metric describing a number of occurrences of an event associated with the exposed group of users and a number of occurrences of the event associated with the control group of users based on the hashes, wherein the metric is based at least in part on a difference between the number of occurrences of the event associated with the users of the exposed group of users and the number of occurrences of the event associated with the users of the control group of users.

14. The method of claim 13, wherein the content item comprises an advertisement.

15. The method of claim 13, wherein each user of the control group of users satisfies one or more targeting criteria associated with the content item.

16. The method of claim 13, wherein the threshold measure of similarity is based at least in part on a threshold number of attributes associated with a user of the control group matching attributes associated with users of the exposed group of users.

17. The method of claim 16, wherein the attribute associated with the user of the control group of users is selected from a group consisting of: an action performed by the user of the control group of users on the online system, an action performed by the user of the control group of users on a third party system, a connection between the user of the control group of users and an additional user of the online system, a connection between the user of the control group of users and an object on the online system, and any combination thereof.

18. The method of claim 16, wherein the attribute associated with the user of the control group of users is selected from a group consisting of: an age of the user of the control group of users, a gender of the user of the control group of users, a geographic area associated with the user of the control group of users, and any combination thereof.

19. The method of claim 13, wherein identifying the control group of users having at least the threshold measure of similarity to the users of the exposed group of users comprises:
   comparing attributes of each of a plurality of users user who were not presented with the content item within at least the threshold interval of time from the time of presentation of the content item to one or more users of the exposed group of users to attributes of one or more users of the exposed group of users;
   computing a similarity score for each user of the plurality of users, the similarity score for a user of the plurality of users based on the comparison of attributes of the plurality of the users to attributes of one or more users of the exposed group of users; and
   identifying, the control group of users as users of the plurality of users having at least a similarity score equaling or exceeding the threshold measure of similarity.

20. The method of claim 19, wherein an attribute associated with one or more users of the exposed group of users comprises an attribute shared by at least a threshold number of the users of the exposed group of users.

21. The method of claim 13, wherein the third party system accesses information describing the number of occurrences of the event associated with the content item and information identifying each of a plurality of online system users associated with the event, and determines the number of occurrences of the event associated with the users of the exposed group of users and the number of occurrences of the event associated with the users of the control group of users based at least in part on a comparison of the provided information and the accessed information.

22. The method of claim 21, wherein the metric is based at least in part on a difference between the determined number of occurrences of the event associated with the users of the exposed group of users and the determined number of occurrences of the event associated with the users of the control group of users.

23. A computer program product comprising a non-transitory computer readable storage medium having instructions encoded thereon that, when executed by a processor, cause the processor to:
   storing, by a social networking server of an online system, an edge store storing connections between users of the online system;
   receiving, at the online system, information describing a content item presented to each user of an exposed group of users of the online system via a client device associated with each user in the exposed group, the information including a time of presentation of the content item to each user in the exposed group;
   obtaining user identifying information from the client device associated with each user of the exposed group of users;
   identifying a non-exposed group of users of the online system outside of the exposed group of users;
   generating a measure of similarity between the exposed group of users and each of the non-exposed group of users based on stored attributes including the stored connections between users in the edge store of the social networking server;
   determining information identifying a control group of users as a subset of the non-exposed group of users having at least a threshold measure of similarity to one or more users of the exposed group of users;
   generating hashes of the user identifying information for the exposed group of users and the information identifying the control group of users to obfuscate identities of the exposed group of users and the control group of users;
   providing the hashes to a third party system, the third party system:
   accessing information describing a number of occurrences of an event associated with the content item and information identifying each of a plurality of online system users associated with the event,
   determining a number of occurrences of the event associated with the users of the exposed group of users and a number of occurrences of the event associated with the users of the control group of users based at least in part on the hashes and the accessed information, and
   generating a metric describing the number of occurrences of the event associated with the exposed group of users and the number of occurrences of the event associated with the control group of users, wherein the metric is based at least in part on a difference between the number of occurrences of the event associated with the users of the exposed group of users and the number of occurrences of the event associated with the users of the control group of users.

* * * * *